US006966682B2

(12) United States Patent
Frank et al.

(10) Patent No.: US 6,966,682 B2
(45) Date of Patent: Nov. 22, 2005

(54) LIGHT BAR MOUNTING ARRANGEMENT

(75) Inventors: George R. Frank, Crown Point, IN (US); Paul M. Gergets, Crown Point, IN (US)

(73) Assignee: Federal Signal Corporation, University Park, IL (US)

( * ) Notice: Subject to any disclaimer, the term of this patent is extended or adjusted under 35 U.S.C. 154(b) by 0 days.

(21) Appl. No.: 10/459,076

(22) Filed: Jun. 11, 2003

(65) Prior Publication Data

US 2004/0252021 A1    Dec. 16, 2004

(51) Int. Cl.[7] ............................................. F21V 29/00
(52) U.S. Cl. ...................... 362/544; 362/542; 362/549; 362/548; 362/185; 362/368
(58) Field of Search ................................ 362/544, 542, 362/549, 546, 249, 457, 493, 543, 548, 184, 362/185, 368; 340/815.73

(56) References Cited

U.S. PATENT DOCUMENTS 1,697,803 A * 1/1929 Beringer ..................... 362/499
3,656,105 A * 4/1972 Steltzer et al. .............. 362/548
5,884,997 A    3/1999 Stanuch et al.
RE36,245 E    7/1999 Stanuch et al.

* cited by examiner

Primary Examiner—Sandra O'Shea
Assistant Examiner—Sharon Payne
(74) Attorney, Agent, or Firm—Leydig, Voit & Mayer Ltd.

(57) ABSTRACT

A signaling system for mounting to an exterior surface of an emergency vehicle opposite an interior surface of the vehicle to which objects are mounted is provided. The signaling system includes a light bar having a plurality of signaling devices supported on and distributed along a base member and enclosed by a cover. A plate is secured to the exterior surface of the emergency vehicle by one or more fasteners of a first type, which pass through the vehicle into its interior. The plate includes a surface for engaging the base of the light bar such that the light bar can be suspended from the plate. An opening is provided in the plate for communicating electrical wiring to the light bar. One or more fasteners of a second type that do not pass through the surface of the vehicle into its interior are provided for securing the light bar to the plate and thereby the exterior surface of the emergency vehicle such that the light bar can be removed from the exterior surface of the vehicle without removing the fasteners of the first type, which hold the plate to the vehicle.

20 Claims, 8 Drawing Sheets

LIGHT BAR MOUNTING ARRANGEMENT

FIELD OF THE INVENTION

This invention pertains to signaling systems for emergency vehicles and more particularly, is directed to warning light assemblies for mounting to emergency vehicles.

BACKGROUND OF THE INVENTION

Emergency vehicles such as police cars, ambulances and fire trucks typically have a signaling system including audio devices such as sirens or speakers and visual indicators such as warning lights. One common type of warning light assembly for emergency vehicles is a light bar. A light bar includes a plurality of lights that are enclosed in a common housing. Different types of lights, such as stationary, strobe, oscillating and rotating lights as well as a speaker or siren can be packaged in a given light bar to provide a variety of different signaling options.

A light bar is generally mounted to a surface on the emergency vehicle such as an exterior sidewall or a roof of the vehicle using bolts that extend through the light bar housing to the interior of vehicle where they are secured via washers and nuts. However, certain emergency vehicles such as ambulances have cabinets or other structures lining the interior walls of the vehicle. As a result, during the assembly process, the light bars must be mounted to the vehicle before the interior of the vehicle is finished with the cabinets in order to allow the necessary access for fastening of the bolts with nuts and washers. Sequencing the assembly process in this manner can cause problems when the ambulance manufacturer does not have sufficient light bar assemblies in stock. In such a case, the ambulances must stand with the interiors unfinished while awaiting delivery of the light bars. This is inefficient, causing unnecessary delays in the assembly process. While ambulance manufacturers recognize this problem, which is exacerbated by manufacturers desire to minimize stock of components such as light bars in favor of just-in-time delivery, they view it as a breakdown caused by the supplier of the light bars, not a problem with the assembly process.

A related problem that arises when a conventional nut and bolt arrangement is used to mount a light bar to an ambulance or the like having interior walls or cabinetry is that once the light bar is mounted it is very difficult and time-consuming to remove because of the lack of access to the fasteners. Consequently, any service or maintenance work on the light bar generally must be performed with the light bar in place on the vehicle. As will be appreciated, this is inefficient because the vehicle must be taken out of service for a significant amount of time to perform the necessary maintenance or service to the light bar.

BRIEF SUMMARY OF THE INVENTION

The invention provides a signaling system for mounting to an exterior surface of an emergency vehicle opposite an interior surface of the vehicle to which objects such as cabinets are mounted. The signaling system includes a light bar having a plurality of signaling devices supported on and distributed along a base member and enclosed by a cover. A plate is secured to the exterior surface of the emergency vehicle by one or more fasteners of a first type, which pass through the vehicle into its interior. The plate includes a surface for engaging the base of the light bar such that the light bar can be suspended from the plate. An opening is provided in the plate for communicating electrical wiring to the light bar. One or more fasteners of a second type that do not pass through the surface of the vehicle into its interior are provided for securing the light bar to the plate and thereby the exterior surface of the emergency vehicle such that the light bar can be removed from the exterior surface of the vehicle without removing the fasteners of the first type, which hold the plate to the vehicle.

DETAILED DESCRIPTION OF THE INVENTION

Figure 1:
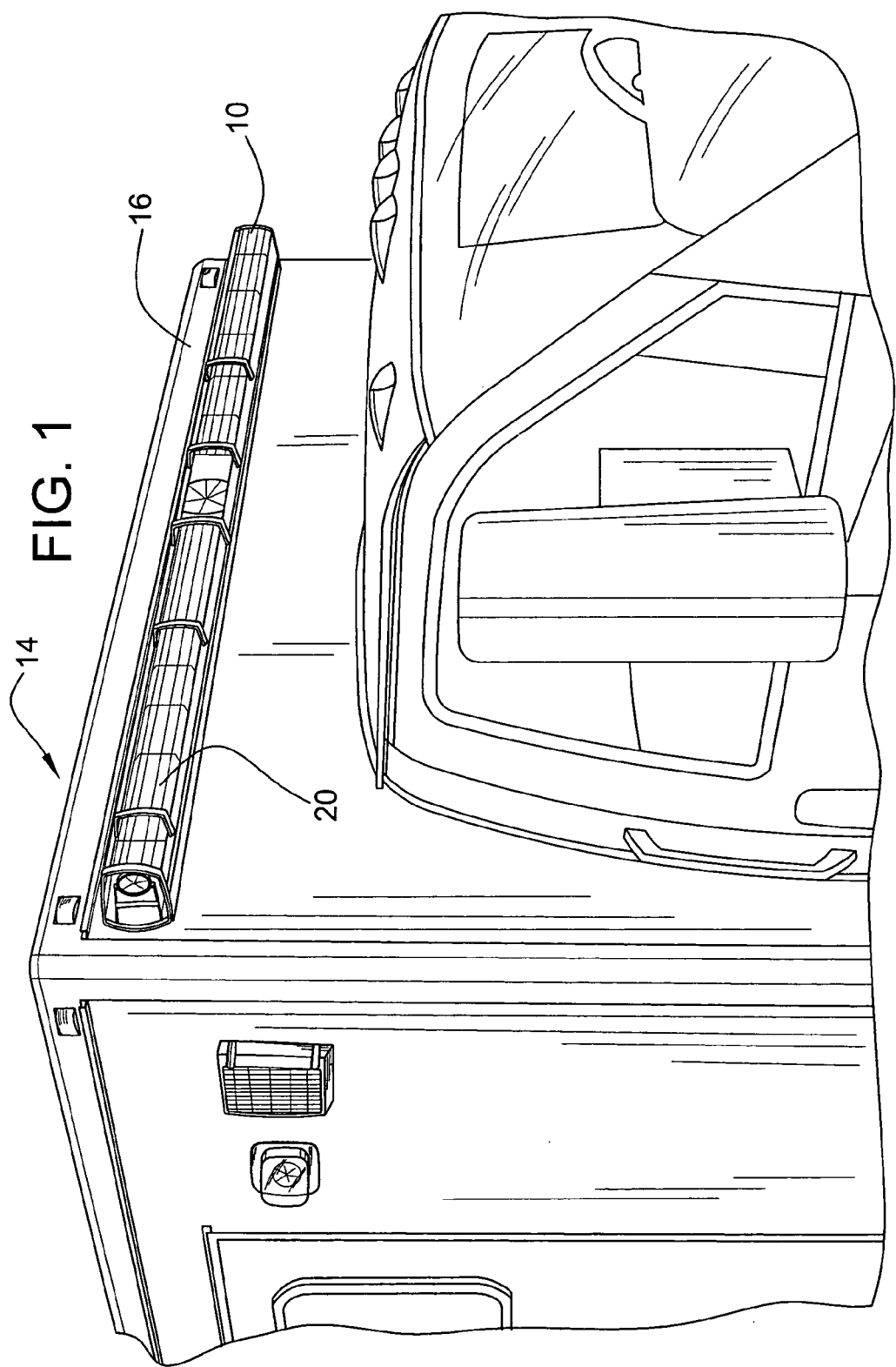
FIG. 1 is a perspective view of an ambulance equipped with an exemplary light bar signaling system in accordance with the invention.

Referring now more particularly to FIG. 1 of the drawings, an illustrative light bar 10 having a mounting arrangement in accordance with the present invention is shown installed on an exterior mounting surface 16 of an emergency vehicle 14, in this case an ambulance. The light bar 10 includes a plurality of signaling devices 12 (see, e.g., FIG. 4) that can be operated individually or together in patterns to provide an emergency or warning signal. In the illustrated embodiment, the light bar 10 is mounted to the side of the ambulance 14. However, as will be understood from the following description, the present invention is equally applicable to mounting on other surfaces of an emergency vehicle including the roof. Moreover, while described in connection with an exemplary ambulance 14, the present invention is not limited to any particular type of vehicle. On the contrary, the present invention could be employed in any context in which it is desirable to be able to mount and remove a light bar 10 without accessing the interior of the vehicle.

Figure 2:
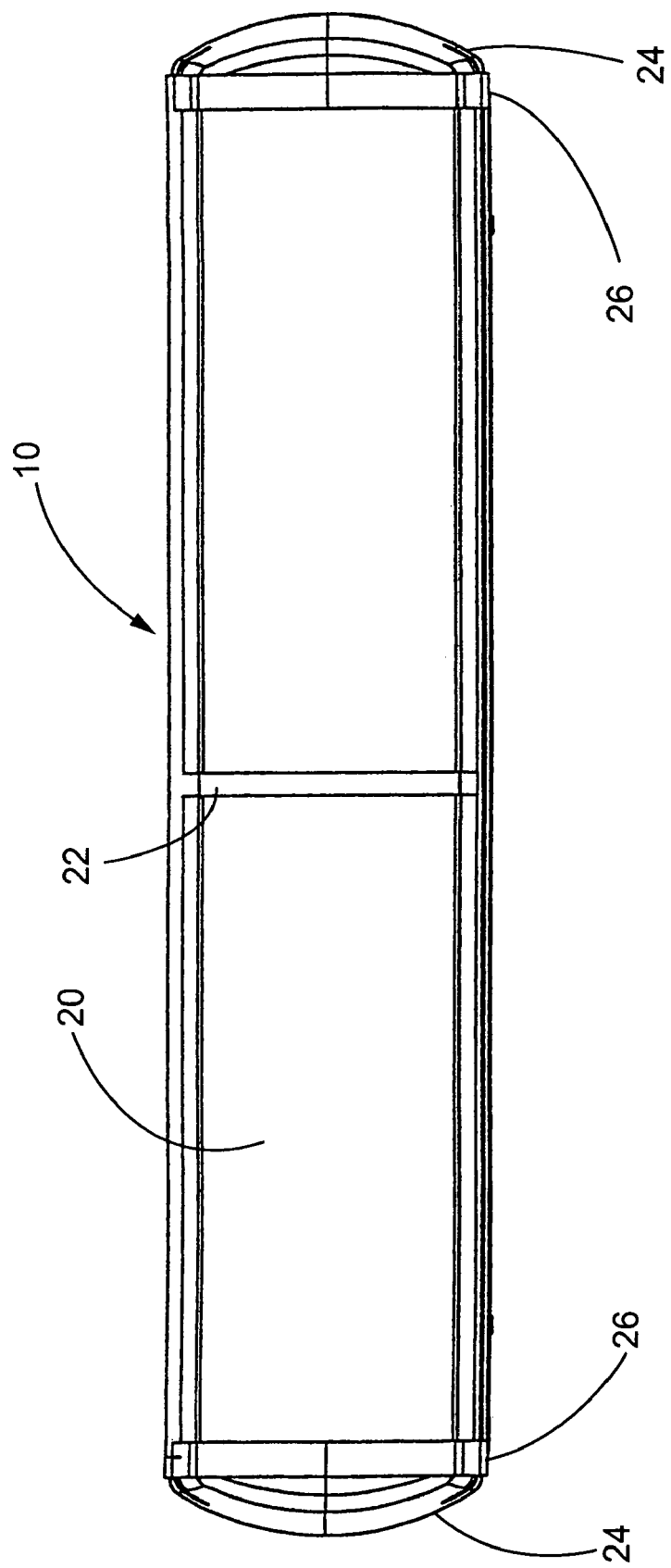
FIG. 2 is a front elevation view of the light bar of FIG. 1.
Figure 3:
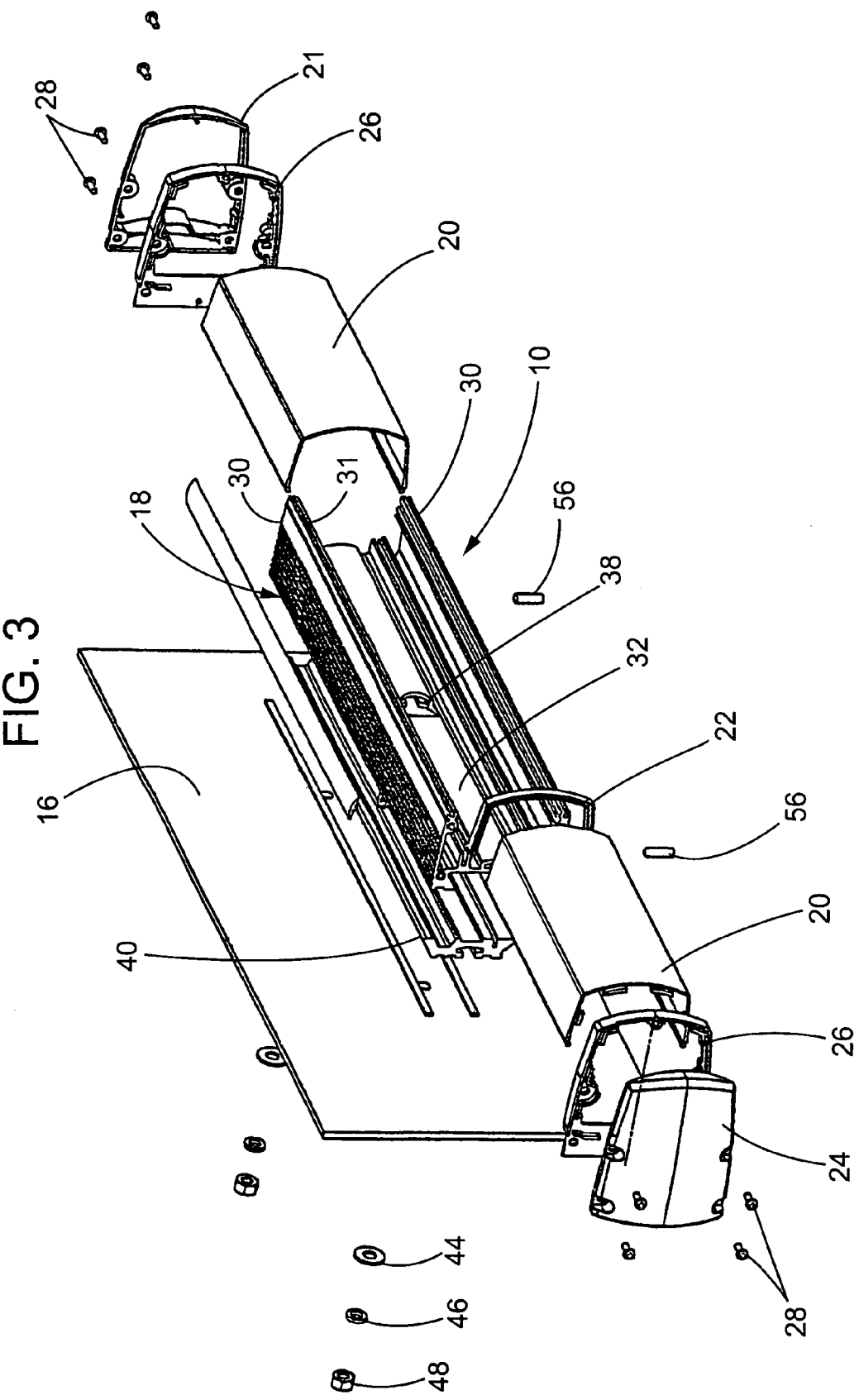
FIG. 3 is an exploded perspective view of the light bar of FIG. 1.
Figure 4:
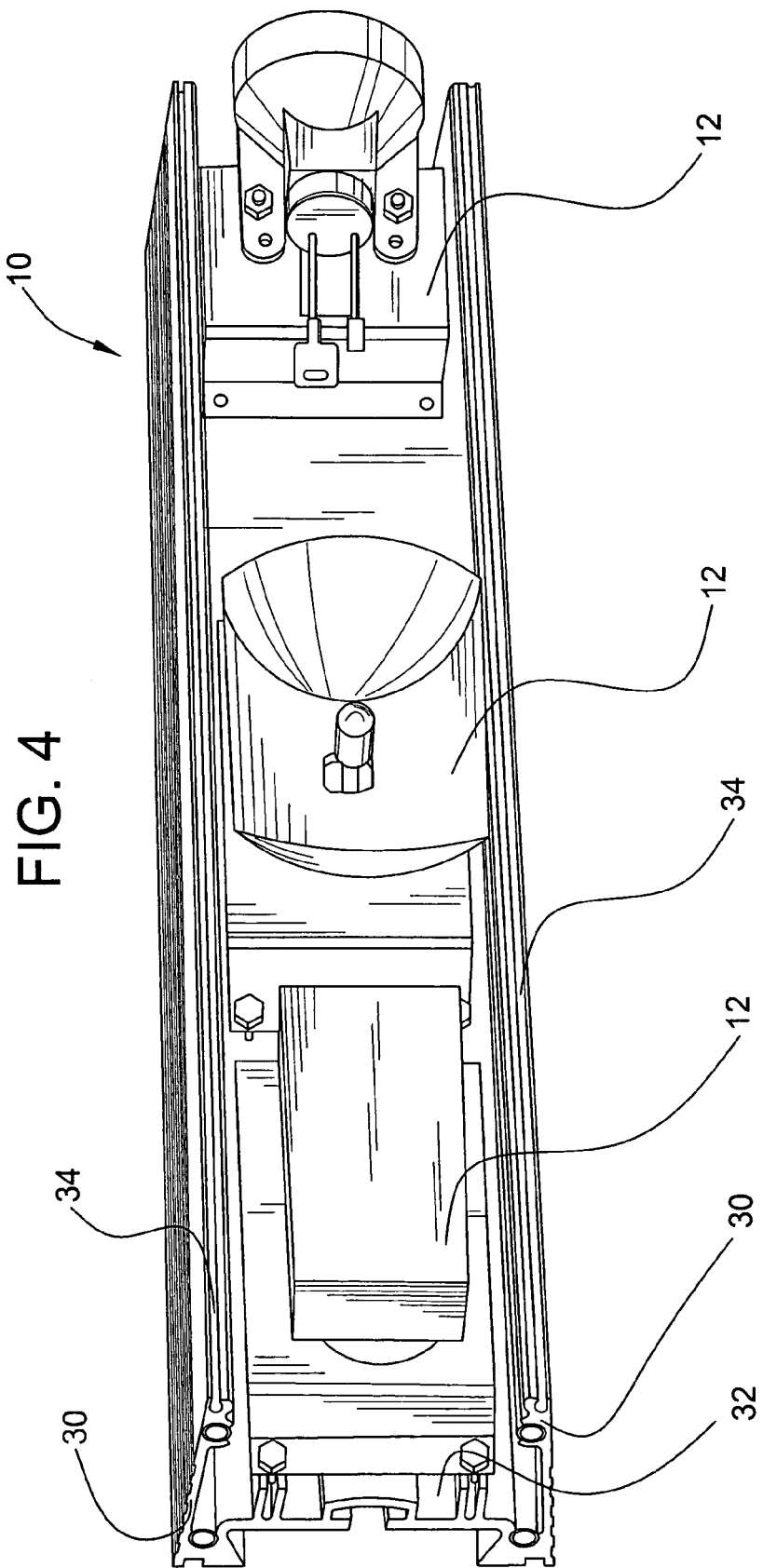
FIG. 4 is a partially cutaway perspective view of the light bar of FIG. 1 showing illustrative signaling devices.

Referring to FIGS. 2, 3 and 4, in the illustrated embodiment, the light bar 10 generally consists of a base member 18 and a dome or cover 20 that is mounted to the base member 18. The signaling devices 12 are supported on and distributed along the base member 18 and enclosed by the cover 20. In this case, the cover 20 consists of two sections that are joined together by a gasket 22 at the seam between the two sections. An end cap 24 and gasket 26 can be attached (e.g., via screws 28) to each end of the assembled base member 18 and cover 20 so as to define a substantially sealed housing for protecting the signaling devices 12 mounted therein from the environment.

To maximize visibility of the signaling devices 12, the cover 20 is typically constructed of a substantially transparent (colored or clear) impact resistant material such as a high impact plastic. In turn, the base member 18 can be formed, for example, from aluminum using a conventional extrusion process. As will be appreciated, the signaling devices 12 contained within the light bar 10 can be of any suitable type including stationary, strobe, oscillating and rotating lights or combinations thereof.

In the illustrated embodiment, the base member 18 is generally channel-shaped in cross-section with a pair of legs 30 that extend outward in generally parallel relation from a crosspiece 32. For receiving the light bar cover 20, each of the legs 30 of the base member 18 includes a groove 34 within which a bead 36 on the outer edge of the cover 20 can be inserted. The cabling or wiring associated with powering and controlling the signaling devices 12 is routed along the base member 18 and out of the light bar 10 through an opening 38 provided in the crosspiece 32 of the base member 18 (see, e.g., FIG. 3).

To help alleviate delays in emergency vehicle assembly operations that are associated with the installation of light bars, the illustrated light bar 10 includes an associated mounting plate 40 (see FIGS. 3, 5 and 6) that allows the light bar 10 to be mounted to an emergency vehicle in an efficient and flexible two-step process. As described above, when assembling emergency vehicles such as ambulances that have cabinets or other structures lining the interior walls or ceiling of the vehicle, light bars using a conventional mounting arrangement consisting of bolts extending through the light bar to the interior of the vehicle must be secured to the vehicle before the interior of the vehicle is finished. Because this assembly sequence cannot be varied, the finishing of the vehicle interiors is essentially halted when light bars are not available at the proper time.

The mounting plate 40 of the present invention helps prevent such delays by allowing the light bar 10 to be mounted in two-steps. In a first step, the plate 40 can be secured to the exterior surface 16 of the emergency vehicle 14 by one or more conventional fasteners that pass through the vehicle to its interior. The light bar 10 can then be secured to the mounting plate 40 and thereby the exterior surface 16 of the emergency vehicle 14 in a second step that does not require installers to access the interior of the vehicle 14. Thus, only the first step would normally have to be completed prior to the finishing of the interior of the vehicle 14.

In contrast to light bars, which are generally built-to-order, the illustrated mounting plate 40 can be a generic item that is useable with light bars of different configurations. As such, emergency vehicle manufacturers can readily and inexpensively maintain an inventory of plates 40 (preferably of differing lengths that would correspond to the standard lengths of light bars) for use in mounting light bars 10. Since access to the interior of the vehicle is only needed to secure the mounting plate 40, this arrangement ensures that there will not be any delays in finishing the interiors of the vehicles even if the light bars 10 for a particular vehicle are not on hand. In particular, if the light bars 10 are not on-hand, suitable mounting plates 40 can be taken from the inventory and secured to the vehicle. The vehicle interior can then be finished with the necessary cabinets and other structures without waiting for delivery of the light bars. Once the light bars 10 are delivered they can be mounted to the vehicle at any time simply by securing the light bars to the mounting plate 40.

The mounting plate 40 arrangement also makes it easier to service and update the light bars 10 installed on a particular vehicle. With conventional mounting arrangements, a vehicle must be taken out of service for a protracted period of time when maintenance is performed on the light bar or when the light bar is updated with new signaling devices. In particular, the maintenance or updating work generally must be performed with the light bar in place on the vehicle because of the lack of access to the light bar fasteners behind the cabinets or other interior structures. In contrast, the mounting plate 40 allows the light bar 10 to be removed from the vehicle quickly and easily so that the vehicle can remain in service while the maintenance or updating work is being performed. Once the work is completed, the light bar 10 can be easily replaced on the vehicle, again without accessing the interior of the vehicle.

Figure 5:
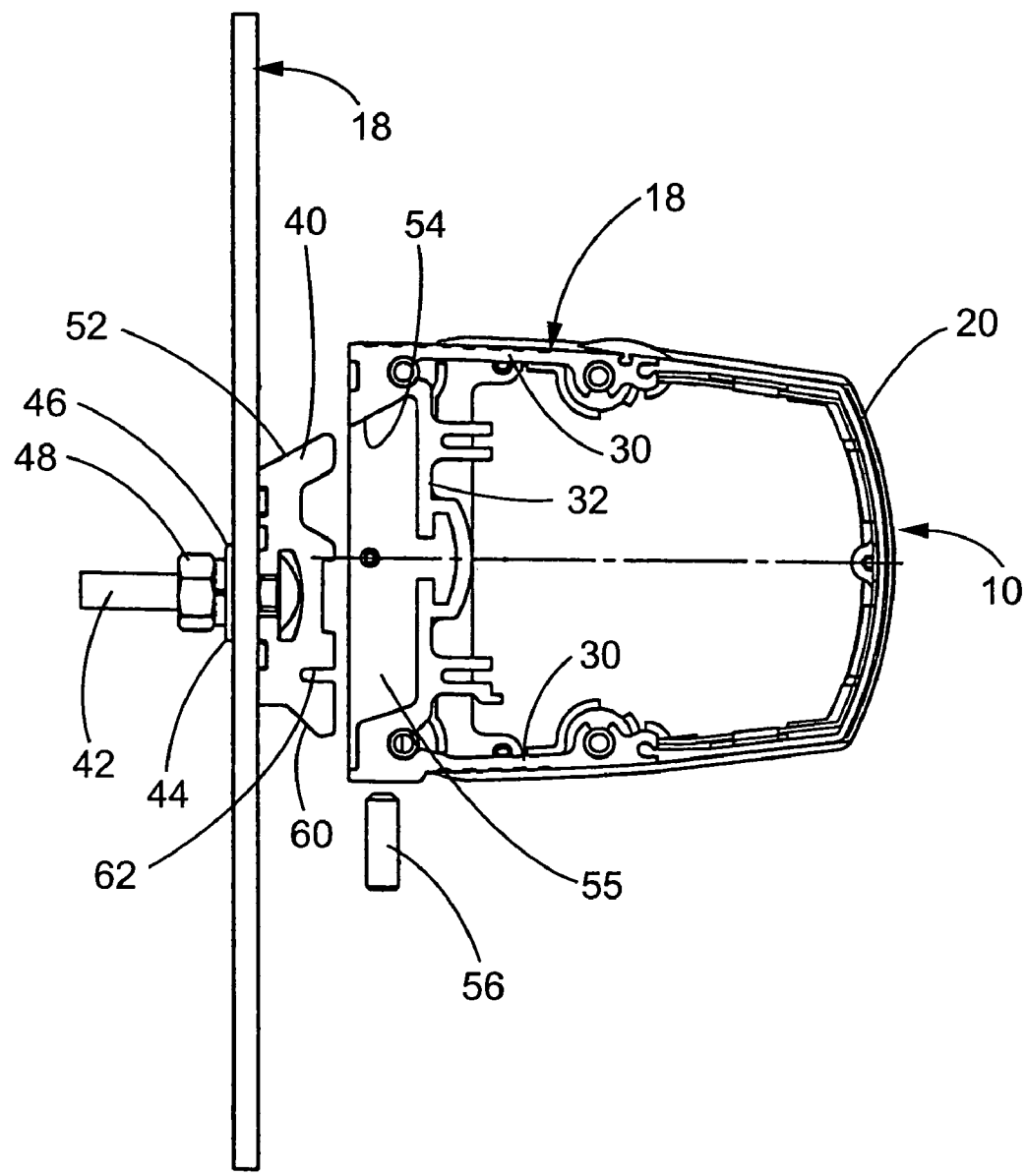
FIG. 5 is a partially cutaway and partially exploded side view of the light bar of FIG. 1 showing the light bar prior to being fastened to the mounting plate secured to the exterior of the ambulance.
Figure 6:
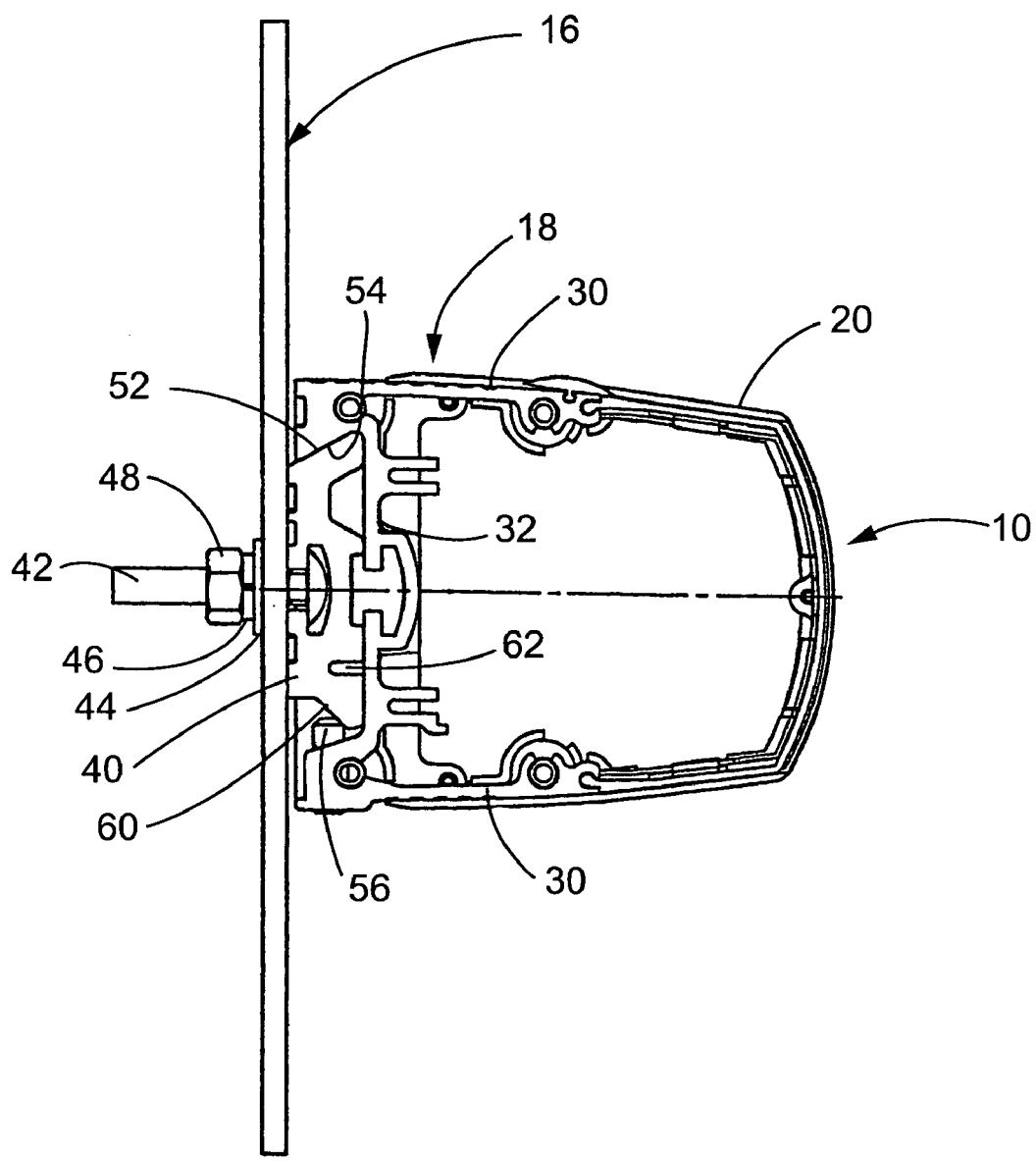
FIG. 6 is a partially cutaway side view of the light bar of FIG. 1 showing the light bar secured to the mounting plate and thereby to the exterior of the ambulance.

The illustrated mounting plate 40 comprises a single element, which, for example, can be formed from aluminum using an extrusion process. However, the mounting plate 40 is not limited to any particular configuration. For example, the mounting plate 40 associated with a particular light bar 10 could consist of a plurality of smaller pieces. Moreover, in the illustrated embodiment, the mounting plate 40 is secured to an exterior surface 16 of the vehicle via carriage bolts 42 that extend through the mounting plate 40 to the interior of the vehicle where they are secured by washers 44, lock washers 46 and nuts 48 as best shown in FIGS. 5 and 6. However, it will be appreciated that any type of fastener can be used to secure the mounting plate 40 to the vehicle surface so long as the mounting plate 40 is held firmly and tightly to the vehicle.

Figure 8:
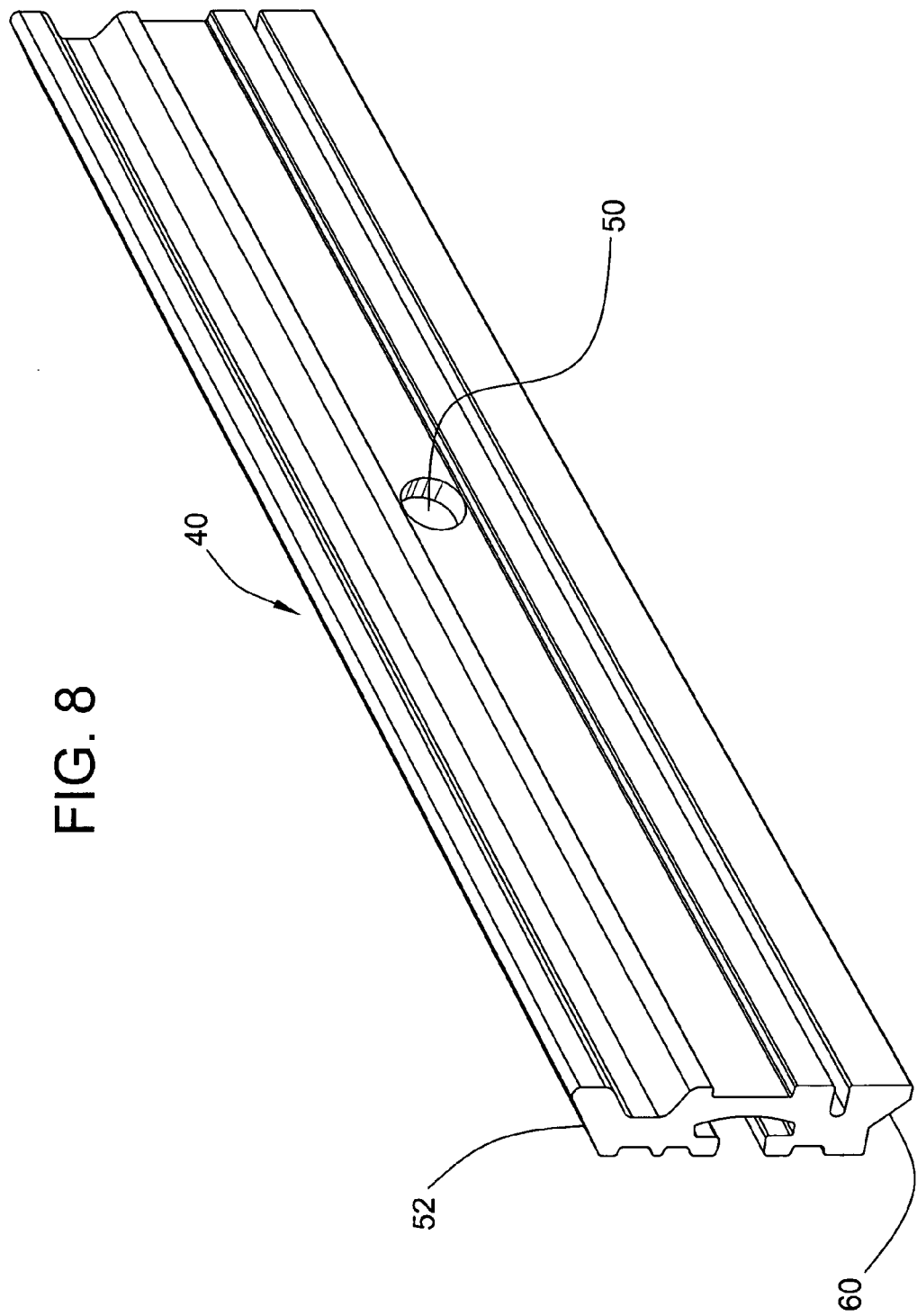
FIG. 8 is a perspective view of the mounting plate of FIG. 1.

To allow for routing of the necessary wires or cables to the signaling devices in the light bar 10, the illustrated mounting plate 40 is configured with a generally central opening 50 (see, FIG. 8) through which the wires or cables can extend to the light bar. In a typical vehicle assembly operation, the necessary wires or cables are fed to the light bar through an opening in the exterior surface of the vehicle. The wires or cables can then be fed to the individual signaling devices through the opening 50 in the mounting plate 40 and the correspondingly located opening 38 in the base member 18 of the light bar (see FIG. 3). Alternatively, the mounting plate 40 could be configured in multiple pieces with the wires or cables being fed to the light bar through the gap between adjacent pieces of the mounting plate.

For supporting the light bar 10, the mounting plate 40 includes a support surface 52 that engages a mating support surface 54 on an inside or rear face of the base member 18 of the light bar (see FIGS. 5 and 6). The illustrated mounting plate 40 is specifically designed for use on vertical surfaces and thus the support surface 52 is located at the upper edge of the plate 40. In this case, the support surface 52 on the mounting plate 40 is configured such that when the mounting plate 40 is secured to a vertical vehicle surface the support surface 52 is oriented such that it angles inward or, in this case, downward as it extends toward the vehicle surface as shown in FIG. 5. The mating support surface 54 on the light bar is arranged at the upper end of a channel 55 in the inside face of the base member 18. As with the support surface 52 on the mounting plate 40, the support surface 54 on the base member 18 is also oriented such that when being mounted to a vertical vehicle surface, the support surface 54 angles inward or downward as it extends toward the vehicle surface. The downward angles of the mating support surfaces 52, 54 helps draw the light bar 10 into close engagement with the mounting plate 40 and, in turn, the vehicle surface 16. As noted above, the present invention is not limited to use for mounting on vertical surfaces and could be used on any vehicle surface.

For securing the light bar 10 to the mounting plate 40, the illustrated embodiment includes a plurality of set screws 56 that are received in corresponding apertures in the base member 18 of the light bar. The set screw apertures are located, in this case, in the lower side of the base member 18 and, when fully inserted, the set screws 56 extend through the side to the channel 55 located on the inside face of the base member 18 (see FIGS. 5 and 6). When the base member 18 is in engagement with the mounting plate 40 and the set screws 56 are inserted into the set screw apertures, the set screws 56 engage an engagement surface 60 on the mounting plate 40 thereby securing the light bar 10 on the mounting plate as shown in FIG. 6. In this instance, the engagement surface 60 angles inward as it extends toward the vehicle surface 16 on which the mounting plate 40 is mounted. As the set screws 56 are being inserted, this inward angle on the engagement surface 60 produces a camming effect which draws the light bar 10 into close engagement with the mounting plate 40 and thereby the vehicle surface 16. This tight connection between the base member 18 of the light bar and the mounting plate 40 helps ensure that the light bar does not loosen due to vibration during operation of the vehicle. Of course, other methods and fasteners can be used to secure the light bar to the mounting plate. For example, the front face of the illustrated mounting plate 40 includes a recess 62 that can receive a standard screw or bolt that would extend through the crosspiece 32 of the base member 18.

Figure 7:
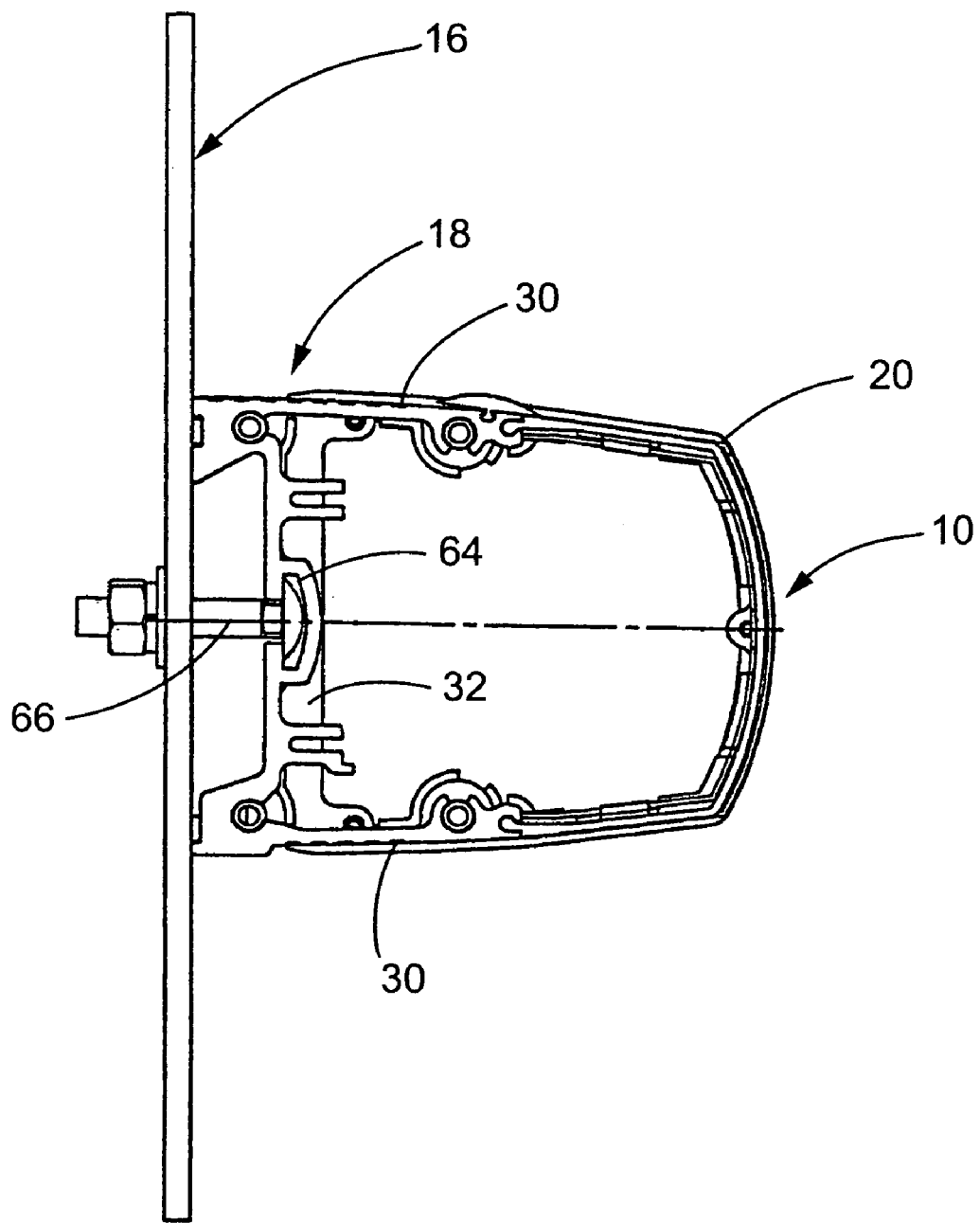
FIG. 7 is a partially cutaway side view of the light bar of FIG. 1 showing the light bar secured to the ambulance using bolts that extend through the exterior of the ambulance.

In the illustrated embodiment, the base member 18 of the light bar is configured to also allow the light bar 10 to be mounted to a vehicle surface using the conventional bolt through the vehicle body method. To this end, the base member 18 has a longitudinally extending slot 64 in the rear face in which the heads of carriage bolts 66 can be received as shown in FIG. 7. The opposing ends of the bolts 66 can then be inserted through an opening in the vehicle surface and secured in place via a lock washer and nut. Thus, an installer has the option of using the mounting plate 40 or the standard mounting method to secure the light bar 10 to the vehicle.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A signaling system for mounting to an exterior surface of an emergency vehicle opposite an interior surface of the vehicle to which objects are mounted, the signaling system comprising:
    a light bar comprising a plurality of signaling devices supported on and distributed along a base member and enclosed by a cover;
    a plate secured to the exterior surface of the emergency vehicle by one or more fasteners of a first type, which pass through the vehicle into its interior, the plate including a surface engaging the base member of the light bar such that the light bar is suspended from the plate with substantially the entire plate sandwiched between the light bar and the exterior surface of the emergency vehicle; and
    one or more fasteners of a second type that do not pass through the surface of the vehicle into its interior for securing the light bar to the plate and thereby the exterior surface of the emergency vehicle such that the light bar can be removed from the exterior surface of the vehicle without removing the fasteners of the first type, which hold the plate to the vehicle.

2. The signaling system of claim 1 wherein the plate includes an opening for communicating electrical wiring to the light bar.

3. The signaling system of claim 1 wherein the one or more first type of fasteners comprise one or more bolts and mating nuts.

4. The signaling system of claim 1 wherein the one or more second type of fasteners comprise one or more set screws supported on the light bar and engageable with the plate.

5. The signaling system of claim 4 wherein the one or more set screws engage a surface on the plate which is configured such that the light bar is drawn towards the plate as the set screws are moved into engagement with the plate.

6. The signaling system of claim 1 wherein the one or more second type of fasteners comprise bolts that extend through the light bar and are received in corresponding recesses in the plate.

7. The signaling system of claim 1 wherein the base member is further configured to receive fasteners of a third type that can be used to secure the light bar directly to the exterior surface of the emergency vehicle.

8. The signaling system of claim 1 wherein the one or more first type of fasteners comprise one or more bolts and mating nuts.

9. The signaling system of claim 1 wherein the one or more second type of fasteners comprise one or more set screws supported on the light bar and engageable with the plate.

10. The signaling system of claim 1 wherein the base member is further configured to receive fasteners of a third type that can be used to secure the light bar directly to the exterior surface of the emergency vehicle.

11. The signaling system of claim 1 wherein the base member is further configured to receive fasteners of a third type that can be used to secure the light bar directly to the exterior surface of the emergency vehicle.

12. A method for mounting a signaling system to a substantially vertical exterior surface of an emergency vehicle comprising, in any appropriate order, the steps of:
   securing a plate to the exterior surface of the emergency vehicle using one or more fasteners of a first type that pass through the vehicle into its interior;
   suspending a light bar on the substantially vertical exterior surface of the emergency vehicle by engaging the light bar with a support surface on the plate such that the light bar is held in position on the substantially vertical exterior surface without any fasteners, the light bar comprising a plurality of signaling devices supported on and distributed along a base member and enclosed by a cover; and
   securing the light bar to the plate using one or more fasteners of a second type which do not pass through the surface of the vehicle into its interior such that the light bar can be removed from the exterior surface of the vehicle without removing the fasteners of the first type.

13. The method of claim 12 further including the step of feeding electrical wiring associated with the light bar through an opening in the plate.

14. The method of claim 12 wherein the one or more first type of fasteners comprise one or more bolts and mating nuts.

15. The method of claim 12 wherein the one or more second type of fasteners comprise one or more set screws supported on the light bar and engageable with the plate.

16. The method of claim 15 wherein the one or more set screws engage a surface on the plate which is configured such that the light bar is drawn towards the plate as the set screws are moved into engagement with the plate.

17. A signaling system for mounting to an exterior surface of an emergency vehicle opposite an interior surface of the vehicle to which objects are mounted, the signaling system comprising:
   a light bar comprising a plurality of signaling devices supported on and distributed along a base member and enclosed by a cover;
   a plate secured to the exterior surface of the emergency vehicle by one or more fasteners of a first type, which pass through the vehicle into its interior, the plate including a surface engaging the base member of the light bar such that the light bar is suspended from the plate with the base member of the light bar engaging the exterior surface of the motor vehicle; and
   one or more fasteners of a second type that do not pass through the surface of the vehicle into its interior for securing the light bar to the plate and thereby the exterior surface of the emergency vehicle such that the light bar can be removed from the exterior surface of the vehicle without removing the fasteners of the first type, which hold the plate to the vehicle.

18. The signaling system of claim 17 wherein the plate includes an opening for communicating electrical wiring to the light bar.

19. The signaling system of claim 17 wherein the plate includes an opening for communicating electrical wiring to the light bar.

20. A signaling system for mounting to an exterior surface of an emergency vehicle opposite an interior surface of the vehicle to which objects are mounted, the signaling system comprising:
   a light bar comprising a plurality of signaling devices supported on and distributed along a base member and enclosed by a cover;
   a plate secured to the exterior surface of the emergency vehicle by one or more fasteners of a first type, which pass through the vehicle into its interior, the plate including a surface engaging the base member of the light bar such that as the light bar is suspended from the plate the light bar is drawn towards the exterior surface of the emergency vehicle; and
   one or more fasteners of a second type that do not pass through the surface of the vehicle into its interior for securing the light bar to the plate and thereby the exterior surface of the emergency vehicle such that the light bar can be removed from the exterior surface of the vehicle without removing the fasteners of the first type, which hold the plate to the vehicle.

* * * * *